W. J. GRAHAM.
COOKING UTENSIL.
APPLICATION FILED APR. 28, 1910.

980,246.

Patented Jan. 3, 1911.

Witnesses
T. P. Britt
L. V. White

Inventor
W. J. Graham
By D. Swift &Co.
Attorneys

THE NORRIS PETERS CO., WASHINGTON, D. C.

UNITED STATES PATENT OFFICE.

WALTER JAMES GRAHAM, OF WHITE MILLS, PENNSYLVANIA.

COOKING UTENSIL.

980,246.  Specification of Letters Patent.  Patented Jan. 3, 1911.

Application filed April 28, 1910.  Serial No. 558,270.

*To all whom it may concern:*

Be it known that I, WALTER J. GRAHAM, a subject of the King of Great Britain, residing at White Mills, in the county of Wayne and State of Pennsylvania, have invented a new and useful Cooking Utensil; and I do hereby declare the following to be a full, clear, and exact description of the invention, such as will enable others skilled in the art to which it appertains to make and use the same.

The invention relates to a cooking utensil and has for its object to provide a device of this character consisting of an ordinary vessel which is to be placed on the stove or fire, and an inner support or member, which is held spaced apart from the cooking utensil.

One of the objects of this invention is especially for the purpose of providing an improved device for cooking fish, but it is understood that other articles of food may be conveniently cooked in this device.

Figure 1:
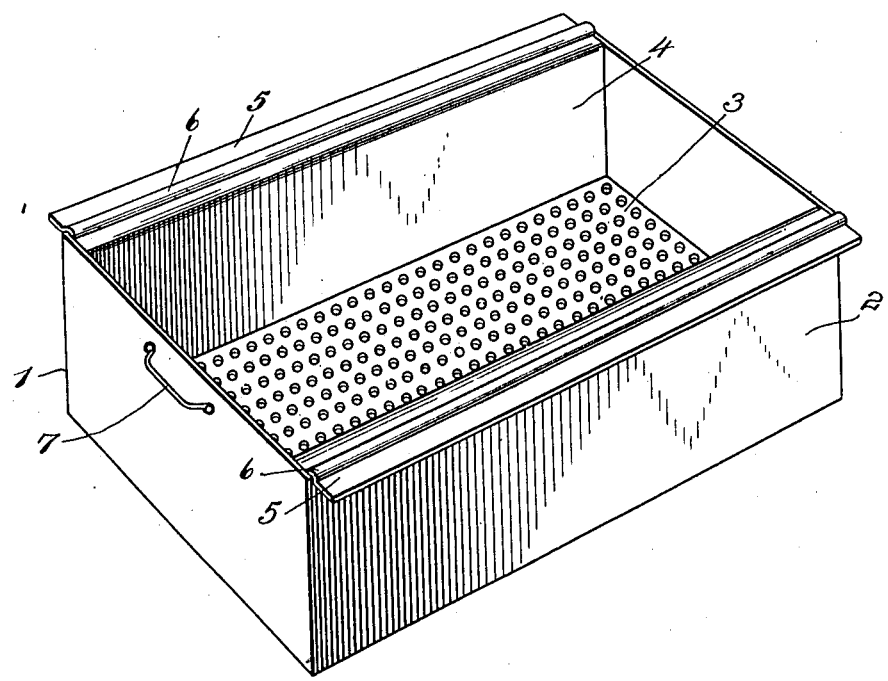
Figure 2:
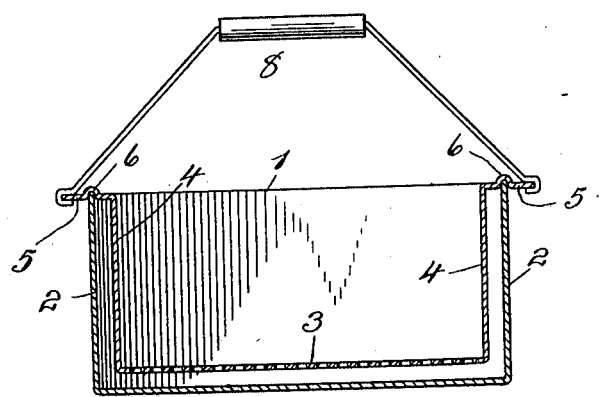

In the drawings:—Figure 1 is a perspective view of my combination cooking utensil. Fig. 2 is a transverse sectional view through the same.

Referring to the drawings, 1 designates a cooking utensil of the ordinary construction having side walls 2. Within this vessel is mounted the inner or supporting member having a bottom 3, which is provided with perforations. The inner member is provided with vertical side walls 4, which are parallel with the walls 2, and are spaced apart, as clearly shown in Fig. 2 of the drawings.

The inner member is provided with outward projections 5, which extend beyond the walls 2 of the outer member, and the projections 5 are provided with depressions 6, which are engaged by the upper part of the side walls 2. These depressions prevent the movement of the inner receptacle, as will be readily understood.

The outer member is provided with a handle of the ordinary construction, as shown at 7. The inner receptacle is provided with a grip 8, which connects with the outwardly projecting portions 5, but the grip 8 can be removed when it is desired.

It will be seen that my invention is simple, inexpensive and durable, and that it is adapted for cooking various kinds of food, and that when the article of food has been properly cooked, the inner pan can be lifted out of the receptacle, and slipped onto the serving dish in a very convenient manner.

What is claimed is:—

In a cooking utensil, the combination of a pair of rectangular receptacles telescopically united, one being smaller than the other and provided with a perforated bottom, said smaller receptacle having its two longitudinal sides provided with outwardly projecting flanges extending beyond the sides of the larger receptacle, said flanges having centrally located elongated grooves extending their entire length to engage the upper edges of two of the sides of the larger receptacle, to hold the receptacles spaced apart, and the smaller one in a fixed position, and a removable grip having its lower ends provided with U-shaped hooks to engage the extended portions of the flanges to remove the smaller receptacle, as and for the purpose set forth.

In testimony whereof I have signed my name to this specification in the presence of two subscribing witnesses.

WALTER JAMES GRAHAM.

Witnesses:
EDMUND ALBERT WOOD,
GEORGE WOODWARD KIMBLE.